(12) United States Patent
Morden et al.

(10) Patent No.: US 8,782,878 B2
(45) Date of Patent: Jul. 22, 2014

(54) FASTENER AUTOMATION SYSTEM

(75) Inventors: Jarrad V. Morden, Waterloo (CA);
Robert S. Underhill, Waterloo (CA);
Charles S. Campbell, Elmira (CA);
Christopher J. Cartile, Guelph (CA)

(73) Assignee: Nikon Metrology NV, Leuven (BE)

( * ) Notice: Subject to any disclaimer, the term of this patent is extended or adjusted under 35 U.S.C. 154(b) by 2163 days.

(21) Appl. No.: 11/527,073

(22) Filed: Sep. 26, 2006

(65) Prior Publication Data

US 2007/0180674 A1 Aug. 9, 2007

Related U.S. Application Data

(60) Provisional application No. 60/721,396, filed on Sep. 28, 2005.

(51) Int. Cl.
*B23P 21/00* (2006.01)
*B23Q 15/00* (2006.01)

(52) U.S. Cl.
USPC ......... 29/720; 29/407.04; 29/407.09; 29/709; 353/28

(58) Field of Classification Search
USPC ............. 81/467; 269/37; 353/28; 700/95; 29/34 B, 281.5, 407.02, 407.04, 407.08, 29/407.09, 709, 720
See application file for complete search history.

(56) References Cited

U.S. PATENT DOCUMENTS

| | | | | |
|---|---|---|---|---|
| 4,951,849 | A | * | 8/1990 | Townsend et al. ............ 29/34 B |
| 5,388,318 | A | * | 2/1995 | Petta .......................... 29/407.04 |
| 5,430,662 | A | * | 7/1995 | Ahonen ......................... 353/28 |
| 6,317,980 | B2 | | 11/2001 | Buck, III |
| 6,688,489 | B2 | | 2/2004 | Bloch et al. |
| 6,843,628 | B1 | * | 1/2005 | Hoffmeister et al. ........... 81/467 |

OTHER PUBLICATIONS

International Search report mailed Sep. 14, 2007 for PCT/US06/38038.

* cited by examiner

*Primary Examiner* — Donghai D. Nguyen
(74) *Attorney, Agent, or Firm* — Howard & Howard Attorneys PLLC

(57) ABSTRACT

A fastener automation system for assembly of fasteners to a substrate, includes a projection system for projecting an image on a substrate of a predetermined location of a correct fastener to be installed in the substrate and data relating to the correct fastener and the substrate, and a computer operably associated with the projection system storing data regarding the correct fastener and the predetermined location on the substrate where the correct fastener is to be installed. An automated method of installing a fastener in a substrate at a predetermined location includes using a projector system to identify a predetermined location for installation of a correct fastener to the substrate, collecting data regarding the correct fastener installation at the predetermined location and storing the data in a computer, and installing the correct fastener in the substrate at the predetermined location based upon the data.

13 Claims, 11 Drawing Sheets

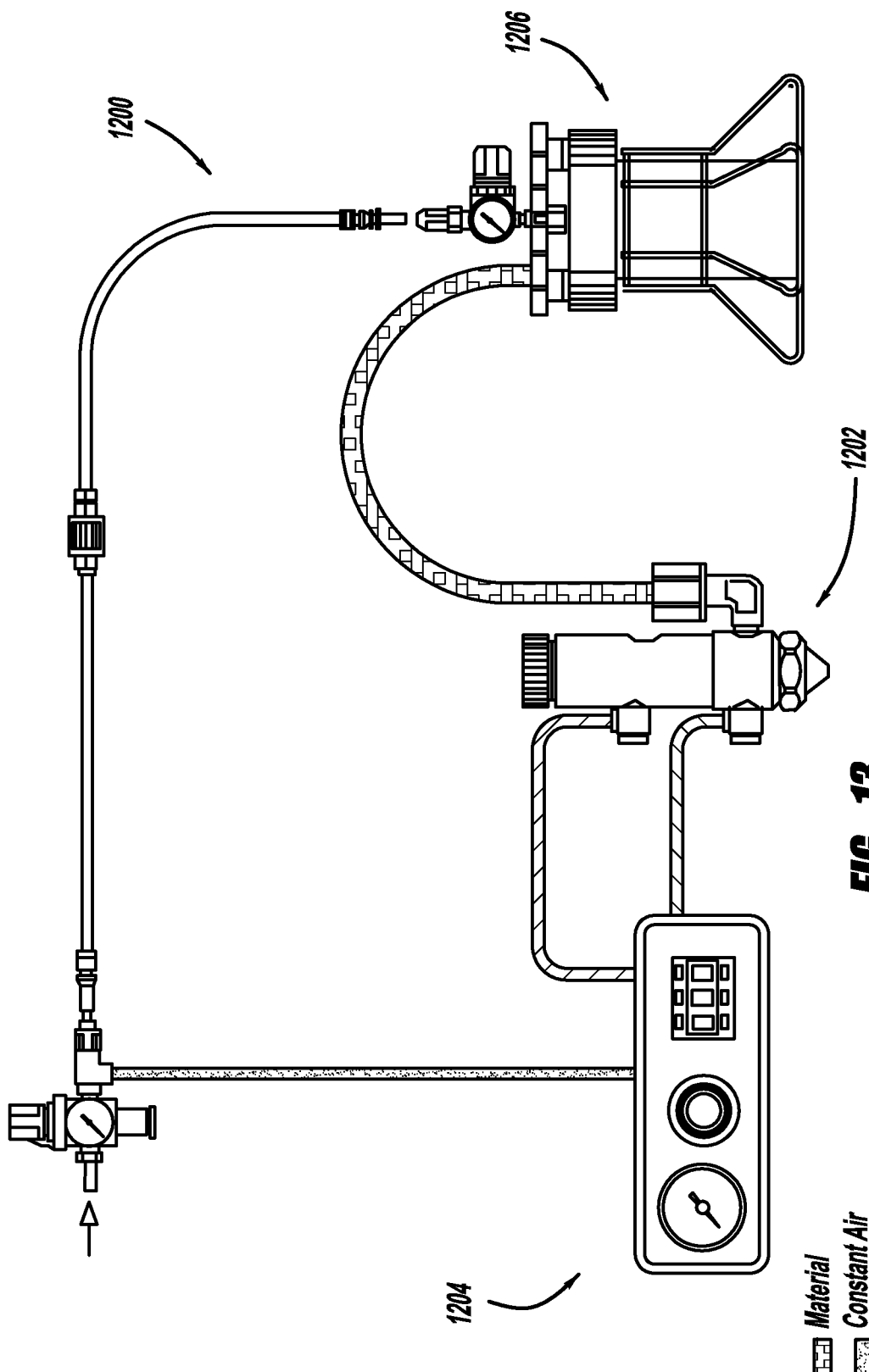

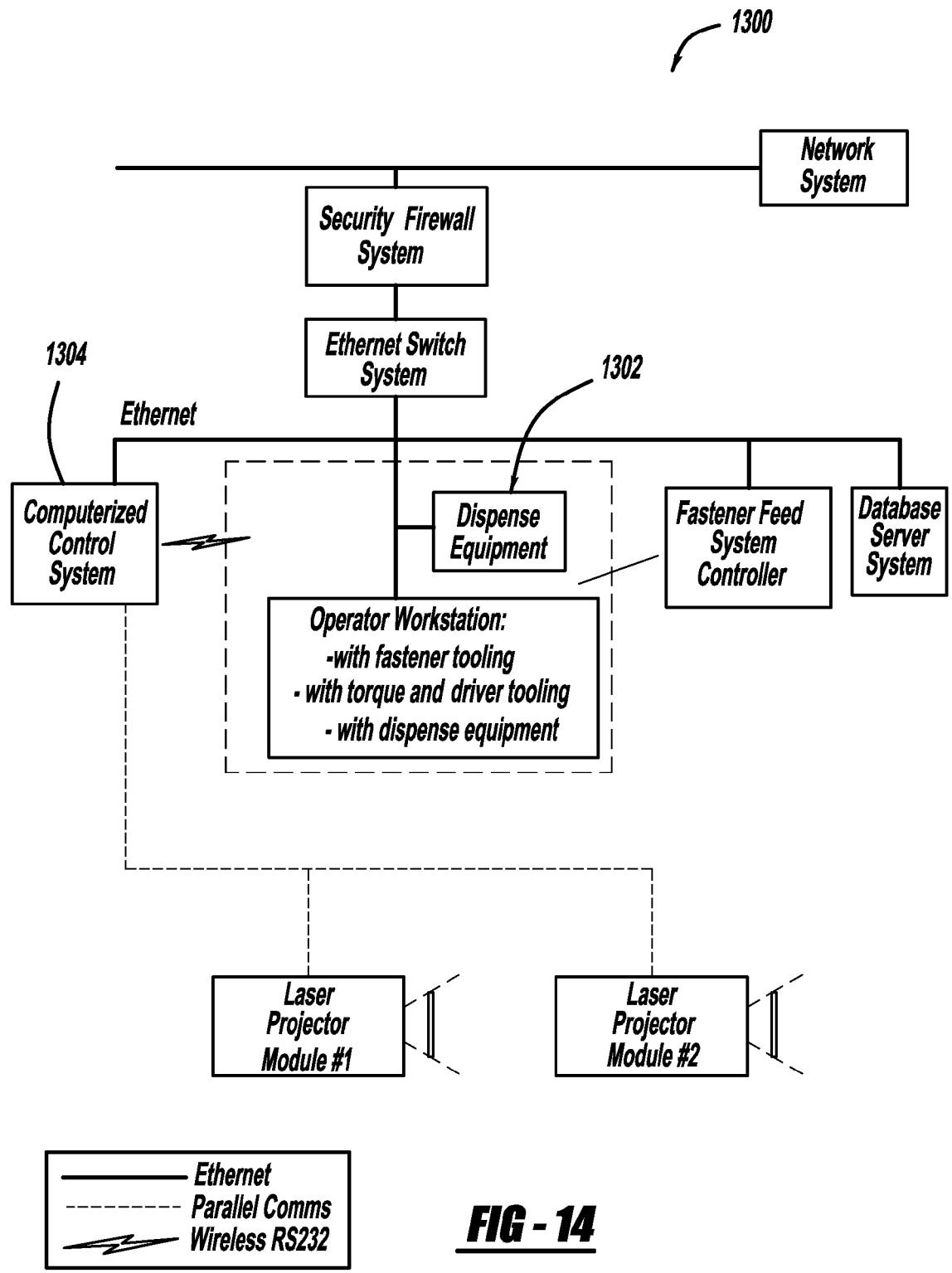

FASTENER AUTOMATION SYSTEM

CROSS REFERENCE TO RELATED APPLICATION

This application claims priority to U.S. Provisional Patent Application Ser. No. 60/721,396, filed Sep. 28, 2005, the entire specification of which is expressly incorporated herein by reference.

FIELD OF THE INVENTION

The present invention relates generally to projection systems for assembly of fasteners to a substrate, particularly to laser projection systems for fastener automation systems, and more particularly to new and improved fastener automation systems that employ laser projector systems to display specific fastener information on precise portions of a substrate in proximity to a particular fastener location.

BACKGROUND OF THE INVENTION

The composite skin assemblies of many of today's aircraft models utilize a carbon fiber skin mated to a metal or composite sub structure. In the case of an aircraft wing assembly process, the skin is shimmed to the structure to ensure a solid mate using a combination of metal, glass and liquid shims. Holes are either pre-drilled or match drilled through all layers so that various types of fasteners can be used to permanently assemble the structure. Various fasteners are used throughout the wing structure.

In a typical aircraft manufacturing process, thousands of specialized bolts and other fastener types are used for fastening composite or aluminum surface skins onto respective ribs and spars. The use of the correct size and length bolt is critical to ensuring that the bolt grip is fully engaged on the structure, and that the bolt can still be fastened to achieve the proper pre-load. It is also important to ensure the bolts installed are not too long as this adds to the overall aircraft weight (and hence fuel efficiency). Most manufacturers today install bolts using a manual process.

In the current manual process, the only means to locate holes is using a copy of the corresponding engineering drawings. The operator must reference the drawings to locate features on the wing and count holes from a reference point to arrive at the intended hole for the fastener. There are numerous sources of potential errors in this process. The operator could miscount holes, misidentify drawing features, or simply mistakenly choose the wrong hole. The requirement to have a complete set of hard-copy drawings available is both difficult to control when full production rates are underway, and it requires space to read the drawings.

Many fastener assembly steps require an operator to perform multiple functions before completing a fastener assembly. When measuring the grip length, the operator must gauge the hole and record the result with a grease pencil. When installing fasteners, the operator must look up which fastener is appropriate for the hole and retrieve it. During all of these steps, it can become time-consuming to constantly refer to the engineering drawings to locate the working hole. All of this time adds no value to the assembly of the wing and introduces many opportunities for error.

The proper bolt grip length for every hole on the wing is determined by measuring the composite thickness of the material at the hole. A manual grip gauge instrumented with a digital Vernier scale is currently used to acquire the thickness measurement. The resulting material thickness is recorded manually using a grease pencil on the wing beside the measured hole. The amount of manual operations and the fragility of the final data make this process potentially prone to bolt selection errors. For example, the grease pencil recordings could be damaged or misinterpreted causing an operator to choose the wrong bolt length. In an effort to speed up the measurement process, operators could become more vulnerable to recording incorrect results. The location of the grease pencil record could also lead to problems later in the assembly process. For example, with the holes on the wing being close together, the operators could use the wrong value for the current hole. Furthermore, the grease pencil is not a permanent method of recording results and is susceptible to smudging or accidental removal. Some assembly processes like the upper wing skins require the measurement process to occur at a different assembly bay than the fastener installation. During transport of the wing assembly, the recorded values are vulnerable to damage or removal. Any amount of destruction in the recorded grease pencil marks will add time to the assembly process as the holes would have to be re-measured. If the result was recorded in another location (i.e., on the engineering drawings) then this value would have to be found and re-recorded in the proper location. In the event that no other record of the measurement exists, then the measurement process would have to be repeated. The problems identified can lead to installing an incorrect fastener grip length. The grease pencil further increases non-value added time to the process for cleaning and removing the residue after the results are no longer needed.

In addition to the physical inefficiencies of measuring and recording the skin thickness, data collection issues also exist. The current process has no capability to archive and track process critical information. A requirement for ongoing process improvement is the ability to store such data for analysis. Such analysis can lead to possible assembly problems that may have otherwise gone unnoticed, or show trends in certain areas of the process that can be manipulated to increase throughput. Without proper storage of data, these benefits cannot be realized.

A complicated step in the installation of fasteners is the final selection of the correct grip length. Engineers have developed some spreadsheet tools to assist in the selection of fastener components. Due to the complexity of these tools, an engineer is required to be used during the assembly process to properly interpret the data. After entering this information into a spreadsheet, the engineer must then analyze the results for acceptable thread protrusion and to avoid a shank out condition.

Further complexity is introduced in some areas where removable skin panels are being installed. Rather than measuring the skin thickness to determine the bolt grip length, the tools are used to determine the proper nutplate size to install. This requirement allows the removable panels to be installed with the same fastener diameter and grip length for ease of maintenance.

The time spent selecting the fastener components is very inefficient due to the complexity involved. This problem is compounded by the fact that an engineer is being used during this process step. Engineering resources can be utilized in a more efficient manor. The current system is both prone to error in using the look-up tables, and inefficient in the use of operators and engineers.

Once the fastener has been properly identified, the operator must then retrieve it from a storage cabinet. Significant increases in cycle time are experienced from the operator having to make numerous trips to the cabinet to retrieve fasteners. The potential for error exists in this step of the process as the operator must choose the correct fastener and place it in the proper hole. Visually identifying that the fastener is the correct grip length is very difficult when the increments are 1/16" or 1/32", so a bolt length gauge must be used to confirm the bolt length. If the fastener storage units are not well isolated, the chance for mixing incorrect fasteners into a bin could result in the wrong fastener being installed. Even with very strict process regulations for filling storage bins in place, the fasteners may be delivered from the supplier with incorrect fasteners in a batch. The current process has no efficient means of ensuring the correct fastener is selected every time.

These issues can also increase the risk of foreign object damage ("FOD") reaching the aircraft. For example, if a fastener is threaded into a click-bond nutplate and is too long, the nutplate could become dislodged and fall into the fuel tank. In addition, if operators are required to carry a sample of fasteners with them during installation, they run the risk of dropping fasteners into work areas accidentally. Elimination of the risk of FOD is essential due to the damage that could be caused as a result.

A critical step in the wing assembly includes the application of sealant and its promoter to the bolt to seal the fuel tank sections. Many holes in the wing skin are in areas on the fuel tank and must be properly sealed to prevent leaks. Ensuring proper adhesion of the skin sealant requires a two step process with two time critical stages. The first step involves precoating the fastener with an adhesion promoter. This substance is essentially a catalyst to the final sealant when the two are combined. The current method of applying the promoter is a simple immersion of the fastener in a container of the promoter material. This step is slow, and does not produce repeatable, efficient results. It could also lead to outside contaminants adversely affecting the sealing. The promoter must be applied to the fastener and allowed to air dry. The length of time required for air drying depends on the type of promoter and sealant being used on the fastener. A widely used sealant is PR-2001 available from PRC DeSoto whose promoter must be applied and air dried for 30 minutes before the sealant can be applied. There is also a maximum time permitted to elapse before the sealant is applied. If the maximum time is exceeded, the promoter must be reapplied, and the time constraints are repeated. The second step in the sealing process involves dispensing the sealant onto the fastener. It is critical that the sealant only be applied locally to the underside of the fastener head and the shank. Sealant must not come in contact with the threaded portion of the fastener. The dispense operation is currently carried out by an operator using a mixing style syringe. The amount of sealant dispensed is completely operator dependent. The volume and bead size will vary on every hole and even more with different operators performing the application. This process can lead to a great deal of material "give-away," meaning a considerable amount of sealant is being needlessly applied due to the inconsistent nature of the application. The volumes used from one fastener to the next, and one operator to the next may be relatively small. However, when this is translated to thousands of holes on a wing, and thousands of wings being produced, there becomes a large potential for savings. The current process of applying the adhesion promoter and sealant does not have sufficient control over logging and monitoring any time criteria. Without such controls in place, there is a risk of repeating work unnecessarily.

The process of physically installing the fasteners is tied closely with the application of sealant as previously described. The sequence of fastener installation is critical to ensure that the faying sealant used between the wing skin and substructure does not cure before the skin is tightened down to its final position. For example, during the build of certain upper wing portions, engineers have identified numerous fastener locations that must be installed first to help smooth out the wing skin. For example, these fasteners must be installed in a specific order and tightened, e.g., to 80% of their final torque specification. After this is complete, then the operator must repeat the sequence to finish the installation at 100% full torque.

The next step in the current process is to identify and install fasteners in a specific sequence, e.g., every 4th hole of the wing skin. These fasteners will again be installed to 80% of final torque, and then the process repeats to tighten them to 100% full torque. This entire procedure must be completed within the span time of the faying sealant. This process introduces a number of inefficiencies due to the segmented steps and torque requirements. It is very time-consuming to locate holes on the wing surface. This issue is evident again during fastener installation because the holes are not done sequentially based on location. The torque procedure that is required also leads to added setup time to ensure the proper torque parameters are being used at all times. The torque specification must be looked up on an engineering drawing for each hole, and must then be configured properly in the torque controller. This process is repeated twice to accommodate the initial installation of fasteners to 80% full torque, followed by the final installation.

The current process outlined is very prone to errors as the number of fasteners in the wing increases. With a lack of sufficient control over the status of every fastener, it is possible for the operators to lose track of which fasteners belong in the current install procedure, as well as which have been installed to 80% torque versus fully installed. This confusion could lead to fasteners being installed incorrectly.

Thus, there has been a long felt need for new and improved fastener automation systems and method of assembly that overcome at least one of the aforementioned problems.

SUMMARY OF THE INVENTION

In accordance with the general teachings of the present invention, a new and improved fastener automation system for assembly of fasteners to a substrate is provided. As used herein, the term "substrate" broadly includes any workpiece, including laminates, such as the skin and underlying support structure of an aircraft wing or body component.

In accordance with a first embodiment of the present invention, a fastener automation system for assembly of fasteners to a substrate is provided, comprising: (1) a projection system for projecting an image on a substrate of a predetermined location of a correct fastener to be installed in the substrate and data relating to the correct fastener and the substrate; and (2) a computer operably associated with the projection system storing data regarding the correct fastener and the predetermined location on the substrate where the correct fastener is to be installed.

In accordance with a first alternative embodiment of the present invention, a fastener automation system for assembly of fasteners to a substrate is provided, comprising: (1) a projection system for projecting an image on a substrate of a predetermined location of a correct fastener to be installed in the substrate and data relating to the correct fastener and the substrate; (2) a computer operably associated with the projection system storing data regarding the correct fastener and the predetermined location on the substrate where the correct fastener is to be installed; and (3) a fastener feed system operably associated with the computer feeding the correct fastener to be installed in the substrate at the predetermined location.

In one embodiment of the present invention, the projection system includes two laser projectors having overlapping fields projecting the same data on the substrate.

In another embodiment of the present invention, the fastener automation system includes a fastener feed system operably associated with the computer feeding the correct fastener to be installed in the substrate at the predetermined location.

In still another embodiment of the present invention, the fastener automation feed system includes a torque wrench operably associated with the computer. The computer includes data regarding the torque to be applied to the correct fastener and controlling the torque wrench to apply a predetermined torque to the correct fastener.

In still yet another embodiment of the present invention, the fastener automation system includes a sealant dispenser operably associated with the computer. The computer includes data regarding the quantity of sealant to be applied to seal the correct fastener in the substrate and the computer controlling the sealant dispenser to apply a predetermined quantity of sealant.

In accordance with a second alternative first embodiment of the present invention, an automated method of installing a fastener in a substrate at a predetermined location is provided, comprising: (1) using a projector system to identify a predetermined location for installation of a correct fastener to the substrate; (2) collecting data regarding the correct fastener installation at the predetermined location and storing the data in a computer; and (3) installing the correct fastener in the substrate at said predetermined location based upon the data.

In one embodiment of the present invention, the method further comprises collecting data regarding a thickness of the substrate at the predetermined location, storing the data in the computer, wherein the computer is selectively operable to select the correct fastener to be installed based upon the thickness of the substrate.

In another embodiment of the present invention, the projector system is a laser projector, wherein the laser projector is selectively operable to project a laser image on the substrate at the predetermined location where the correct fastener is to be installed in the substrate.

In still another embodiment of the present invention, the projector system includes at least two laser projectors that are selectively operable to project overlapping laser fields of the same data on the substrate.

In still yet another embodiment of the present invention, the method further comprises storing data in the computer regarding the correct fastener to be installed based upon the data collected, wherein the computer is operably associated with a fastener feed system, wherein the computer is selectively operable to control the fastener feed system so as to feed the correct fastener to an area adjacent the substrate.

In a further embodiment of the present invention, the method further comprises storing data in the computer of a correct torque to be applied to the correct fastener, wherein the computer is operably associated with a torque wrench, wherein the computer is selectively operable to control the torque wrench so as to apply the correct torque to the correct fastener.

In a still further embodiment of the present invention, the method further comprises storing data in the computer of liquid sealant to be applied to the fastener installation and the computer is operably connected to a liquid sealant dispenser and the computer controls the liquid sealant dispenser to apply a predetermined quantity of sealant to the fastener installation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 13 illustrates a schematic view of a promoter/sealant dispensing system, in accordance with a thirteenth embodiment of the present invention;

FIG. 14 illustrates a schematic view of a control architecture system with a promoter/sealant dispensing system, in accordance with a fourteenth embodiment of the present invention.

The same reference numerals refer to the same parts throughout the various Figures.

DETAILED DESCRIPTION OF THE INVENTION

Figure 1:
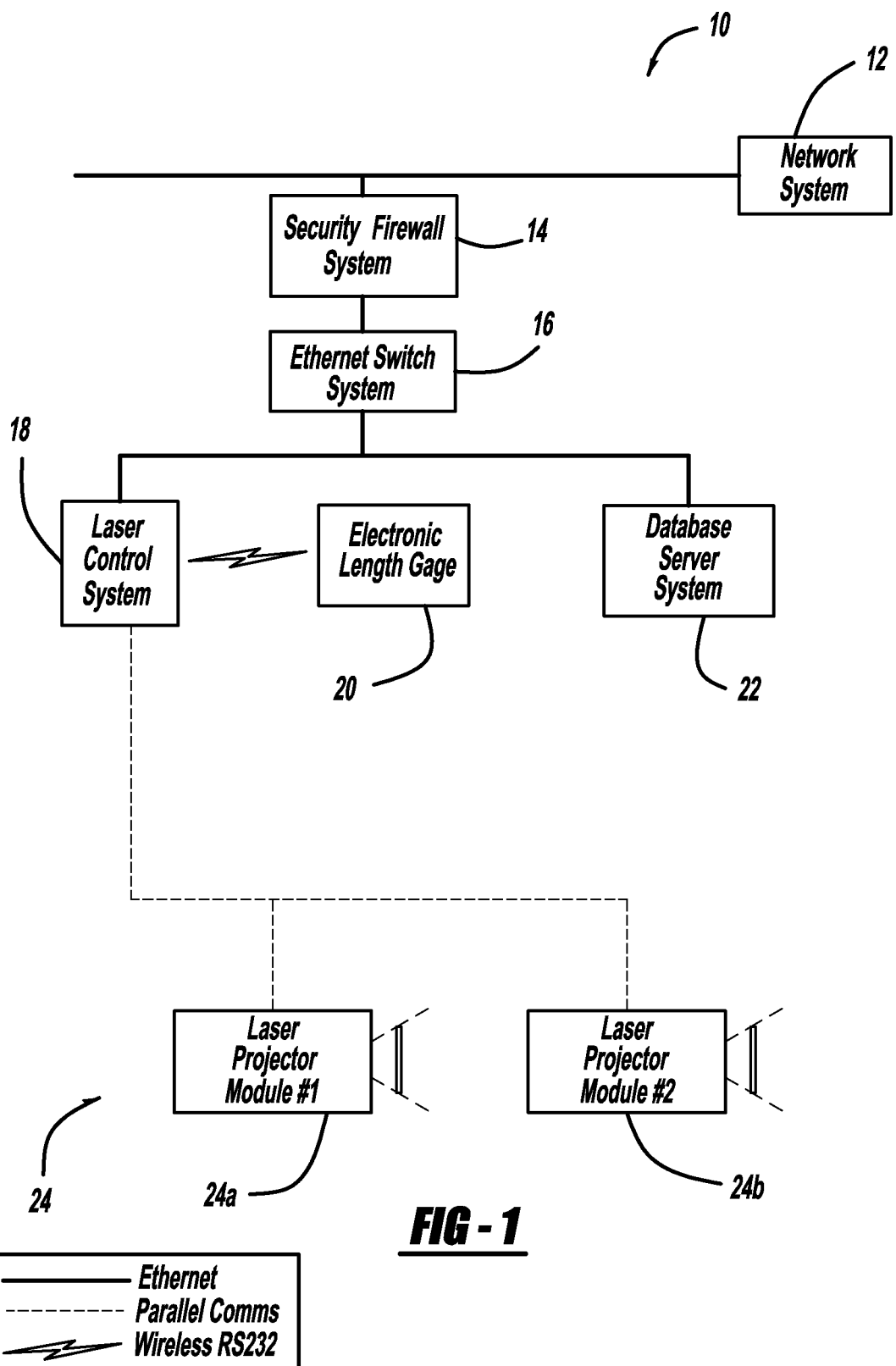
FIG. 1 illustrates a schematic view of a core architecture system employing a laser projection system, in accordance with a first embodiment of the present invention.

The following description of the preferred embodiment(s) is merely exemplary in nature and is in no way intended to limit the invention, or uses.

As set forth in the following detailed description of the preferred embodiments of this invention, this invention relates to a fastener automation system particularly, but not exclusively, for aircraft assembly. Although the fastener automation system of this invention is intended primarily for aircraft assembly, this invention may also be utilized for other industries including, for example, the automotive industry.

This invention is particularly suitable for automating assembly operations requiring a plurality of different fasteners at precise locations as described in more detail in the following description of the preferred embodiments. First, the precise location where a fastener is to be installed is identified with a projector, preferably a laser projector. The laser projector can be any conventional laser projector system, such as a laser projector system disclosed, for example, in U.S. Pat. No. 5,646,859 assigned to the assignee of this application, wherein laser targets are located at predetermined locations relative to the substrate and the laser projector periodically or continuously scans the laser targets to determine the precise position of the laser projector relative to the substrate. Alternatively, the laser projector can be "targetless" as disclosed in pending applications of the Applicant. A conventional "overhead" light projector can also be used. In one preferred embodiment, two laser projectors are utilized to project overlapping fields of projection with the same information, such that if the projection from one source is blocked by operating personnel, for example, then the other projector will provide the required location and data. The laser projectors can be fixed or portable as also disclosed below.

The precise location where a fastener is to be installed in a hole in the substrate is identified with a projector or projectors. Data regarding the fastener installation is then collected and stored in a computer. In the disclosed embodiment, the data collected includes the thickness of the substrate, but may also include the fastener thread diameter, hole diameter, length or the like. The computer can also be connected to a gauge measuring the thickness of the substrate to automatically input the data based upon previously entered design or engineering parameters. Further, in the disclosed embodiment, the fasteners are male fasteners, such as studs, bolts, hangers and the like, and the substrate includes a plurality of spaced holes or bores. The projector then identifies the hole where the fastener is to be installed and the laser projection may also include an identification of the male fastener to be installed in the identified hole. Alternatively, the installation of female fasteners can also be automated by this invention, wherein self-clinching female fasteners are installed in preformed openings or self-piercing female fasteners are installed at precise predetermined locations.

The fastener system of the present invention can then be used to feed the correct fastener to the identified location from a conventional fastener feed system, such as a bowl feeder disclosed in the following description, magazine or pawl feeder or other conventional fastener feed systems.

The present invention is also particularly useful for automatically installing fasteners requiring a predetermined torque and installed using a torque wrench. In the disclosed embodiment, the torque wrench is connected to the computer for applying a predetermined torque to the fastener based upon data input to the computer. In many applications, an initial torque is applied to the fasteners less than the final torque, such as 80%. In such applications, a plurality of fasteners is initially torqued as required by the specification and, following installation of a plurality of fasteners, the fasteners are torqued to the final torque.

Finally, in certain applications, a sealant must be applied to avoid leakage of the fastener in the substrate. The sealant dispenser can also be connected to the computer to dispense a precise quantity or volume of sealant to each fastener or the opening which receives the fastener to accurately control the sealing of the fastener in the substrate. Further, where the sealant must cure for a predetermined time, the computer may notify the operator when the sealant has cured sufficiently for installation and warn the operator to install the fastener before the sealant has fully cured.

As will be understood from the above, the fastener automation system of the present invention also provides a computer record of each of the fasteners installed in the substrate, including a record of the fasteners installed at each location, the torque applied to each of the fasteners and the application of a sealant, if used. Such an electronic record is of particular importance in critical applications, such as assembly of aircraft. The following is a detailed description of one embodiment of a fastener automation system and method of assembly for assembly of aircraft. However, as will be understood by those skilled in this art, this invention may be utilized for automation of the installation of fasteners in various applications.

By way of a non-limiting example, the present invention will now be described with specific reference to the construction of an aircraft wing assembly; however, as previously noted the present invention can be practiced with many other industrial applications.

Referring to FIG. 1, there is shown a schematic view of a core architecture system 10 employing a laser projection system, in accordance with a first embodiment of the present invention. The primary components of the system 10 include a network system 12, a security firewall system 14, an Ethernet switch system 16 (e.g., for providing electronic grip length gauge with wireless data transmission), a laser control system 18 (e.g., a PC running appropriate software programs), an electronic fastener length gauge 20, a database server system 22 (e.g., a SQL database server useful for data storage), and a laser projection system 24, including at least two laser projector modules 2a, 2b, respectively. It is important to note, however, the architecture system 10 may include only one laser projector. The laser projector modules 2a, 2b, respectively, preferably provide a 40 degree field of view ("FOV") and are preferably mounted to movable or removable stands such that the projector modules are operable to ensure full coverage of the work piece, e.g., a wing. assembly. By way of a non-limiting example, retro-reflective targets or infra red diode targets can be mounted to any wing fixture tooling or at predetermined locations relative to the fixture.

Figure 2:
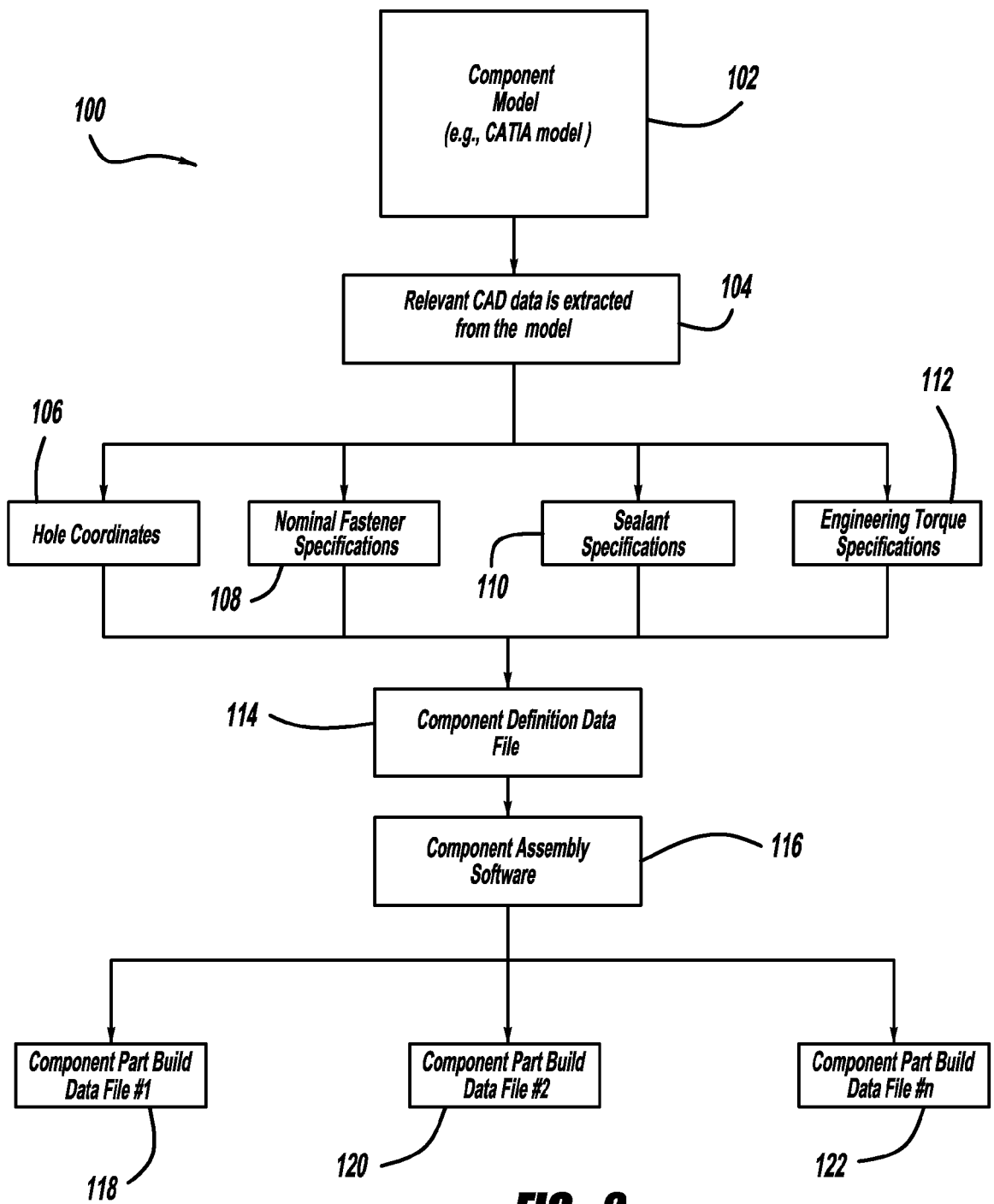
FIG. 2 illustrates a schematic view of a data extraction system employing a laser projection system, in accordance with a second embodiment of the present invention.

Referring to FIG. 2, there is shown a schematic view of a data extraction system 100 employing a laser projection system, in accordance with a second embodiment of the present invention. By way of a non-limiting example, a component model, e.g., a three dimensional CATIA™ model available from Dassault Systems, is provided at 102 for the specific component to be assembled, in this case a wing assembly. Then relevant data, e.g., CAD data, is extracted from the component model at 104. The data can include, for example, hole coordinates at 106, nominal fastener specifications at 108, sealant specifications at 110, engineering torque specifications at 112, and/or the like. From this data, a component (e.g., a wing assembly) part definition data file is created at 114. Then, appropriate component (e.g., a wing assembly) assembly software is created at 116. The software includes several data files, e.g., a first component (e.g., a wing assembly) part build data file 118, a second component (e.g., a wing assembly) part build data file 120, and at least one more (represented by the symbol n) component (e.g., a wing assembly) part build data file 122.

By way of a non-limiting example, the present invention leverages the 3D model information to improve the assembly process. For instance, the 3D coordinate location of every hole on the wing assembly can be obtained from the model and stored. The coordinates of installed retro-reflective targets for example can be surveyed using a laser tracker, and the results can also be stored. The laser projection system can use these coordinates to resolve the position of each laser with respect to the tooling and parts. With all of the coordinate information that has been compiled, the projection system can visually locate any hole on the wing assembly that requires work.

In addition to locating holes for the operator, all relevant engineering information can be compiled into electronic database files for every wing assembly part number. Assembly parameters, such as nominal fastener grip length, torque requirements and sealant specifications can be stored for every hole on the wing assembly. Without any operator intervention, the present invention can provide all of these engineering parameters for use at the appropriate stage of assembly and communicate them to the operator as required.

All of the electronic data can be stored on a network (e.g., a computer, server and/or the like) for use by the engineering staff. If any of the assembly parameters change, the appropriate file can be modified to reflect it. Prior to starting work on a new wing assembly, the operator workstations can download the appropriate files onto the local computer. A central SQL server can link the network to the local computers while maintaining any required security regulations. Every subsequent build of a wing assembly will use the updated engineering information, reducing the risk that outdated information will be used.

Figure 3:
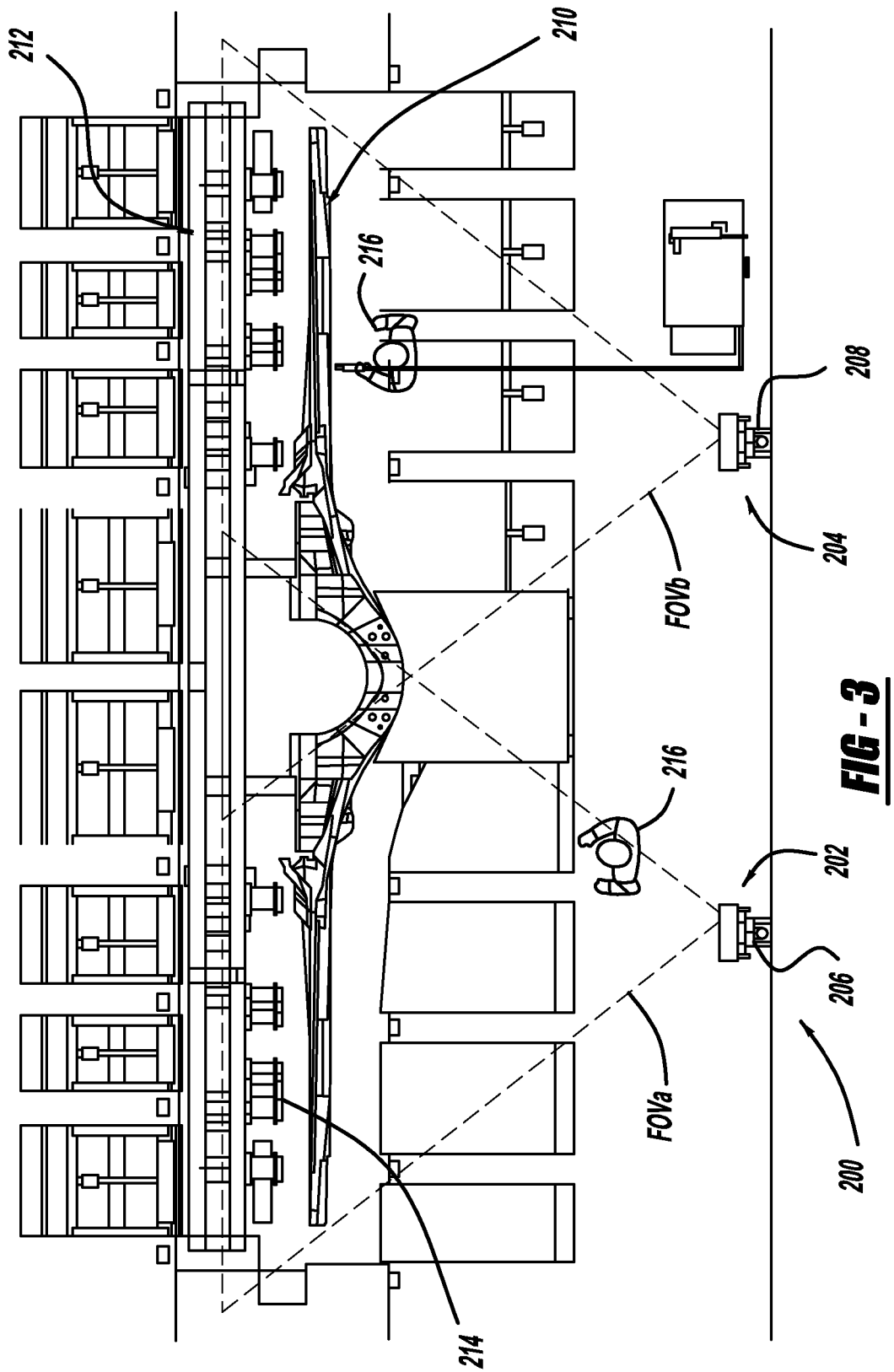
FIG. 3 illustrates a schematic view of a laser projection system, in accordance with a third embodiment of the present invention.

Referring to FIG. 3, there is shown a schematic view of a laser projection system 200, in accordance with a third embodiment of the present invention. By way of a non-limiting example, two laser projectors 202, 204, respectively are employed, each with an approximate 40 degree field of view, FOVa, FOVb, respectively, and are preferably integrated onto a lift platform 206, 208, respectively, or other appropriate structure. Although two laser projectors are shown, it should be appreciated that one or more than two projectors can be used in the practice of the present invention. By way of a non-limiting example, the wing assembly 210 jig or fixture tooling 212 can have laser targets, such as retro-reflective targets 214 installed on it for laser projector calibration purposes. Alternatively, a targetless laser projection system may be used as disclosed in the copending patent applications of the assignee of this application. The location of the laser projectors 202, 204, respectively, is important to ensure that the entire wing surface can be covered and that each laser projector has enough retro-reflective targets in its field of view to calibrate accurately. After the projectors have scanned the retro-reflective targets on the wing assembly 210 fixture tooling 212, the hole location information can be related back to the laser projector positions. The system software can then be used to step the operator 216 through a pre-defined set of holes on the wing assembly 210 and improve the main process tasks of grip measurement and fastener installation.

By way of a non-limiting example, the use of multiple laser projectors in a single assembly bay provides a more robust projection than a single projector can. For example, operators will be working very closely to the wing surface and could interrupt the projection from a single source. Multiple projectors can be set up to project the same information overlapped on each other. The accuracy of the projectors makes the overlap invisible to the operator. Therefore, if the projection from one laser projector source is blocked, then the other laser projector will still provide the required assistance/information.

Figure 4:
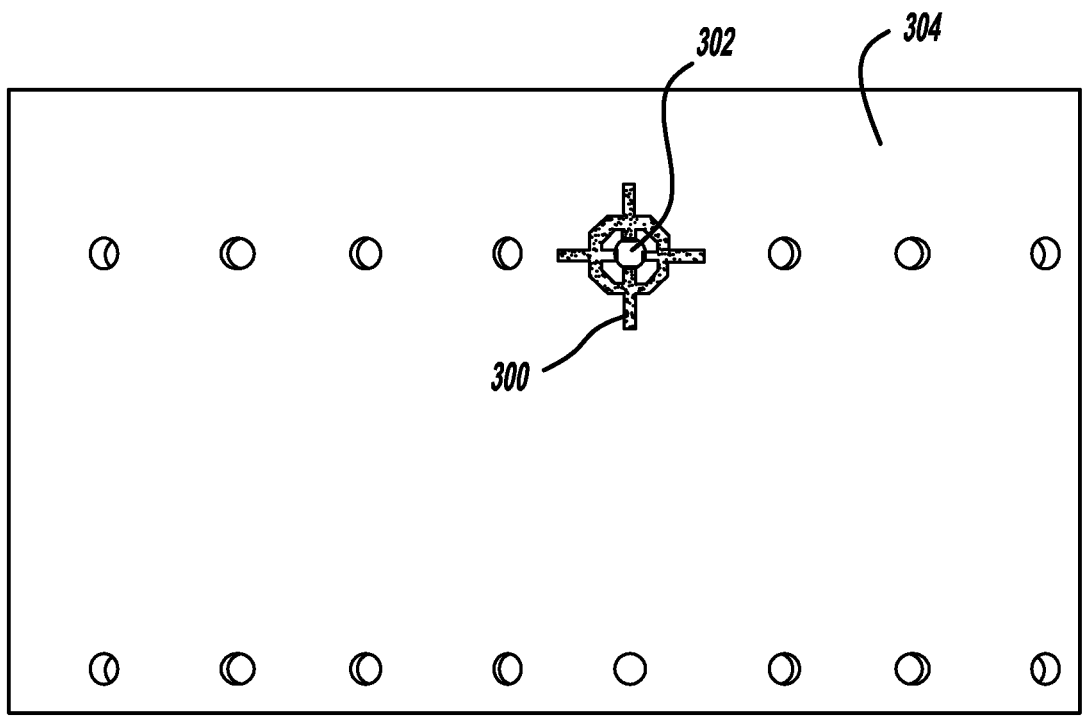
FIG. 4 illustrates an elevational view of a laser projected indicator of a working hole on a work piece, in accordance with a fourth embodiment of the present invention.

Referring to FIG. 4, there is shown an elevational view of a laser projected indicator 300 of a working hole 302 on a work piece 304 (e.g., a wing assembly), in accordance with a fourth embodiment of the present invention. In this manner, the present invention can be employed to identify specific fastener holes on the wing assembly. With the stored position data, the laser projector can accurately identify which one of the hundreds or thousands of holes currently requires a measurement. This functionality drastically reduces the time required by an operator to locate a specific hole and perform a measurement. As soon as a measurement is successfully completed, the system of the present invention can automatically identify the next hole in the work flow. This sequence will continue until all holes in the current work flow are measured. The measurement results can also be electronically stored for use during installation.

Figure 5:
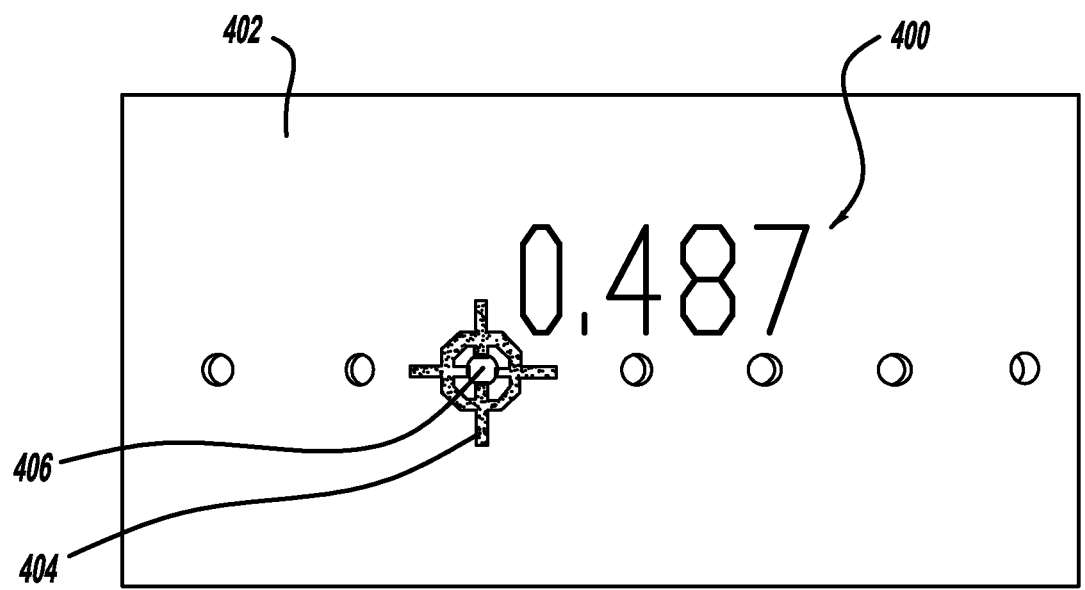
FIG. 5 illustrates an elevational view of a laser projected measurement value on a work piece, in accordance with a fifth embodiment of the present invention.

Referring to FIG. 5, there is shown an elevational view of a laser projected measurement value 400 on a work piece 402 (e.g., in proximity to a laser projected indicator 404 of a working hole 406), in accordance with a fifth embodiment of the present invention. Thus, the present invention can further assist wing assembly by projecting the logged measurement information. For example, if an operator were to go back to re-measure a hole for verification, the stored value can be projected as a quick reference to indicate whether the measurement is valid. In the case where a grip length dash number was manually selected, the projection system can identify this to the operator as well. This feature eliminates the need to have access to the computer screen to reference the stored information.

Figure 6:
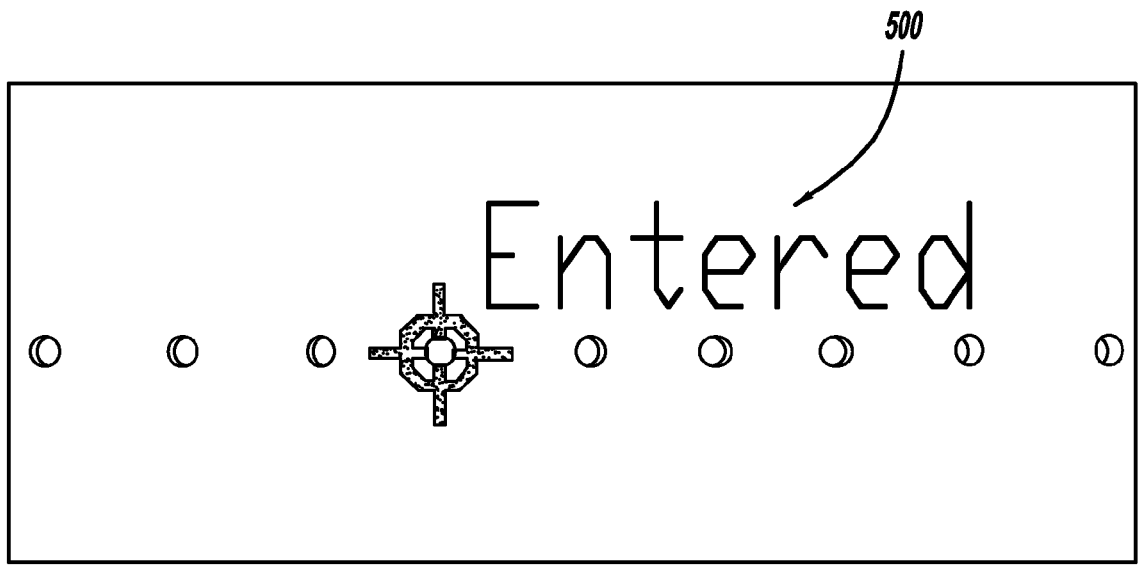
FIG. 6 illustrates an elevational view of indicia that the laser projected measurement value of FIG. 5 has been entered into a database, in accordance with a sixth embodiment of the present invention.

Referring to FIG. 6, there is shown indicia 500 that the laser projected measurement value of FIG. 5 has been entered into a database, in accordance with a sixth embodiment of the present invention.

Figure 7:
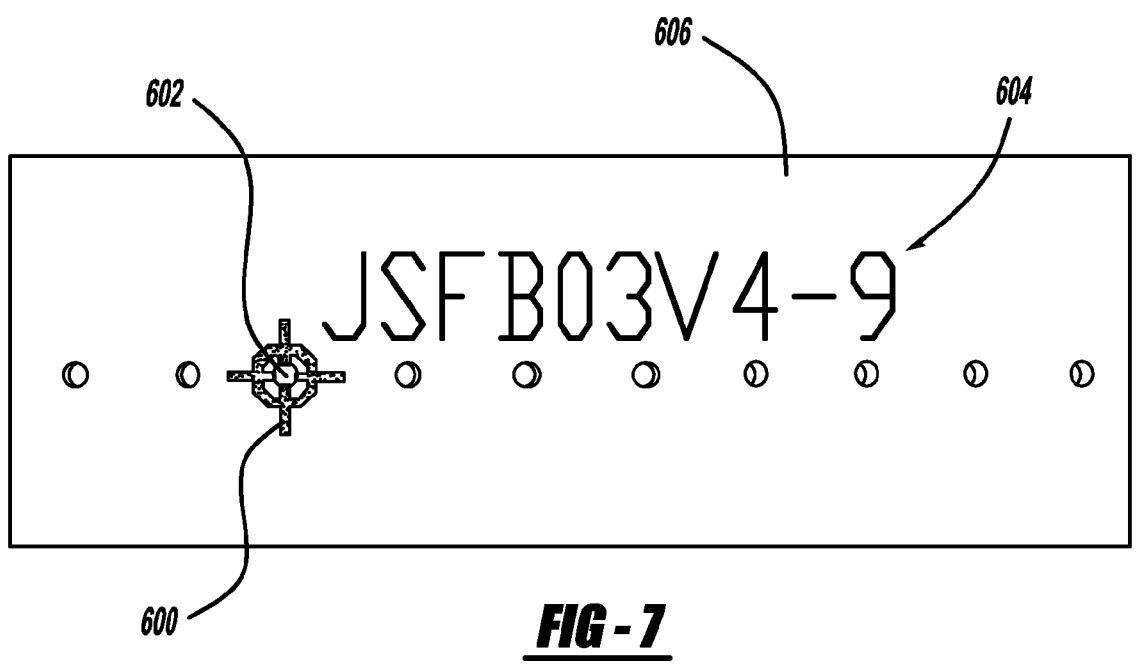
FIG. 7 illustrates an elevational view of a laser projected indicator of a working hole with a fastener part number on a work piece, in accordance with a seventh embodiment of the present invention.

Referring to FIG. 7, there is shown an elevational view of a laser projected indicator 600 of a working hole 602 with a fastener part number 604 on a work piece 606, in accordance with a seventh embodiment of the present invention. Thus, the present invention projects the actual fastener part number that is to be installed in the current hole. In some assembly operations, measurement and installation are performed at different locations. This restraint does not limit the present invention. Because all of the prior measurement data has been stored, it can be called up at a later stage in assembly and used for installation. The part number has been determined previously based on the stored fastener data from the engineering drawings and the thickness value obtained in the measurement process. When the operator returns to this hole to install the fastener, the projector will again locate the hole with a graphic, and project the fastener part number, e.g., as shown in FIG. 7. The system will guide the operator through a pre-defined sequence of holes for installing fasteners and project the relevant information for the current hole.

The system of the present invention can also handle multiple operators working on the wing assembly simultaneously. For example, all of the holes on the wing assembly can be split into appropriate sections for work by multiple operators. For one operator, the graphic can be depicted as a circle with a cross-hair, while the graphic for another operator can have a different shape to ensure the holes are uniquely identified. The system can step each operator through their own set of holes to speed up the task of completing the entire wing assembly.

With respect to measuring and recording the grip length, the system of the present invention can use a grip gauge that is capable of electronically transferring the measurement result directly to the application software. For example, the data transfer can be done using wireless RS-232 technology. This feature will further enhance the mobility of equipment and will not introduce tripping hazards due to cabling. By way of a non-limiting example, when the operator is using the electronic grip gauge, the system will first guide them to the current working hole using the projection graphic, as previously described. The operator then has to properly insert the gauge into the hole, when it is seated, and a trigger button can be pressed to initiate a read of the serial data. This grip measurement will be stored and automatically converted to a specific fastener grip length using previously-developed formulas. The stored information is then linked to the hole number that was being projected. Each unique wing assembly serial number will have its own log file of results from the assembly process. The operator can then be stepped through all holes on the wing assembly and each of their skin thickness measurements can be stored in this fashion.

When the information is compiled on a computer, the computer files can be uploaded to a central server for access at subsequent assembly stations. For example, when the wing assembly is finished at the measurement station, it can be transported for work elsewhere. When it arrives at the fastener installation station, the operator must simply connect the mobile workstation to the server computer and download the log file using the wing assembly serial number. Another advantage of the fastener automation system and method of this invention is that the substrates, such as wing assemblies, may be assembled in any sequence by one or a plurality of operators as described below.

As measurements are performed, the result is automatically logged in a thickness column and the grip length dash number is calculated and logged in a dash column. The information stored now fully defines the correct fastener to install in the hole.

System flexibility is also considered in designing the system software of the present invention. A separate grip gauge can be used to measure a hole for validation purposes. In this case, the software provides the option for the user to manually enter the grip gauge value. Once this is done, the system will automatically convert the measurement to a dash number as before. Quality checks on the measurement data can also be performed. For example, the existing manual gauge used during one build can be used to re-measure holes and compare the results with those stored in the database. The logged result can be displayed to the operator. This will make it easy for the user to reference the recorded value while re-measuring the hole. Furthermore, if an engineer determines that a specific dash number is required, they can choose it from a pull-down list of available dash numbers. In this case, the interface logs the fact that a measurement was not used in determining the dash number. Logging such abnormal events will allow engineers to have a history of how the wing was assembled.

With the simple addition of electronic measurement and storage, the tedious process of measuring and recording the result with a grease pencil can be eliminated. The automatic calculation of grip length will also help reduce the risk of improper bolt selection that may lead to FOD.

The risk of data vulnerability has also been drastically reduced because everything can be safely archived to a server for future use. The time savings also increase as there will no longer be thousands of grease pencil markings to clean off the wing assembly skin. A process that once required numerous time-consuming steps, has now been streamlined into one step per hole without risk of losing valuable data. The measurement data can now be archived electronically for future analysis.

Another benefit of the system of the present invention is the data collection and tracking capability. With data logged about critical process information, trends and analysis can be performed to further improve the system performance on an ongoing basis.

The system of the present invention can also incorporate error proofing into the system software. For example, the dash value calculated from the hole measurement must typically be within 2 grip lengths from the nominal. If there is a problem detected, the system software can identify the problem and alert the operator to take corrective action.

A further benefit that has been incorporated into the software system is the time stamping of critical process steps. For example, the time information can be recorded with a successful measurement and installation. This data can be manipulated to identify if any portions of the wing assembly consistently takes longer than others. This information can be used to aid in continuous improvement efforts. Process cycle times can also be calculated using the timestamp data.

In addition to the aforementioned laser-assisted assembly system, numerous other automation technologies can be integrated to further reduce the current inefficiencies. These technologies include: (1) a fastener feed system; (2) fastener installation tooling; and (3) promoter and sealant dispensing systems. Each of these subsystems can have their own controllers for execution of feeding/installing/coating the fastener. However, a computerized control system can govern when these tasks are to be executed and will provide the necessary parameters to determine fastener selection and torque requirements for each individual hole location. Furthermore, the computerized control system can log results from each system as they occur.

Figure 8:
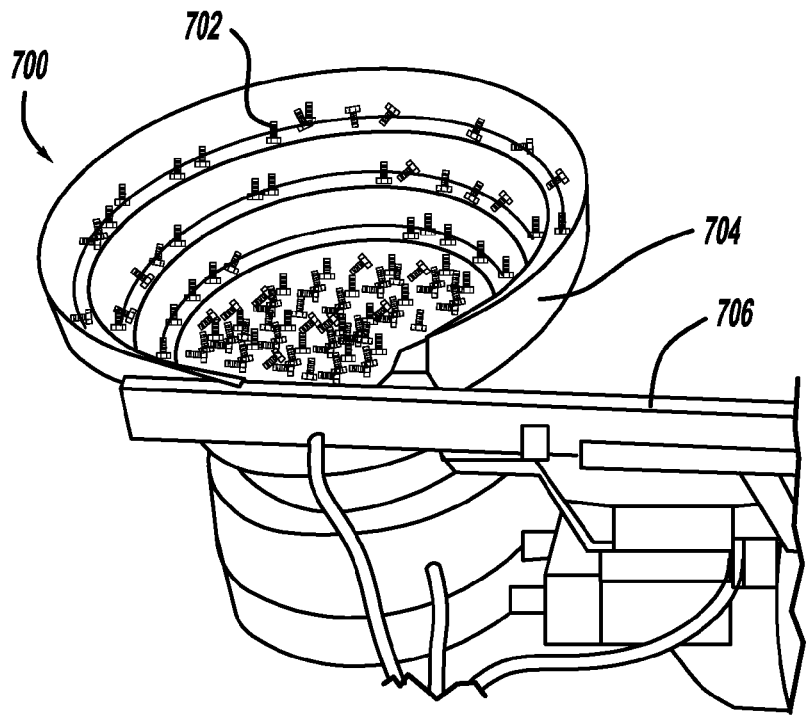
FIG. 8 illustrates a partial perspective view of a bowl feed system for fasteners, in accordance with an eighth embodiment of the present invention.

Referring to FIG. 8, there is shown a partial perspective view of a bowl feed system 700 for fasteners 702, in accordance with an eighth embodiment of the present invention. For example, a commercially available fastener feed system can be integrated into the previously described wing assembly process. Currently, an operator has to walk to a bulk storage cabinet, retrieve the corresponding fastener, and return to the work area to insert it into the hole. This process adds a great deal of wasted time to the production of the wing and introduces a potential risk of FOD.

A common method of automatically orienting bulk fed fasteners 702 is using a vibratory bowl feeder 704. Alternatively, magazine feeders may be used. In the disclosed embodiment, the operator can simply bulk load a batch of the same fasteners 702 into the bowl 704. When a control system senses that its output is below a predetermined level, the bowl feeder 704 will automatically turn on and begin feeding the fasteners 702 into an output track 706 until it is full again. Bowl feeders can be built to feed fasteners grouped by diameter, or singled out by diameter and grip length depending on the application. Commercially available, modular feed systems exist that are designed to deliver varying fastener sizes on demand to a single destination. The system is comprised of a rack assembly that houses the various bowl feeders required for the system. The number of unique bowl feeders required is driven by the type of fastener and number of variations of the fastener that are needed for the assembly of the wing assembly. As known by those skilled in this art, each bowl feeder can have an escapement at the end of its output track that shuttles the fastener into position over a blow feed tube. When the control system requests that particular size fastener, the blow tube is actuated and sends the fastener through the delivery tube. The blow tubes will converge on a final feed path for delivery to the tool. The final feed path can be diameter specific (so all fasteners of a common diameter are fed through this tube) or can be designed to accommodate all diameters fed into one blow tube. Fasteners are typically fed up various levels of the bowl. Improperly oriented fasteners fall back into main body of the bowl. Properly oriented fasteners are queued in the outfeed track. Low-level sensor indicates when to turn the bowl on and fill the outfeed track. Fasteners are cingulated at the end of the track in an escapement and prepared for blow feeding. In some cases, a wing assembly may only require a small amount of a specific fastener to be used, which makes it unnecessary to implement a dedicated bowl to feed them. In this case, most commercially available systems have a drop tube to allow manual loading of a specific bolt if it was supplying further automation equipment.

Figure 9:
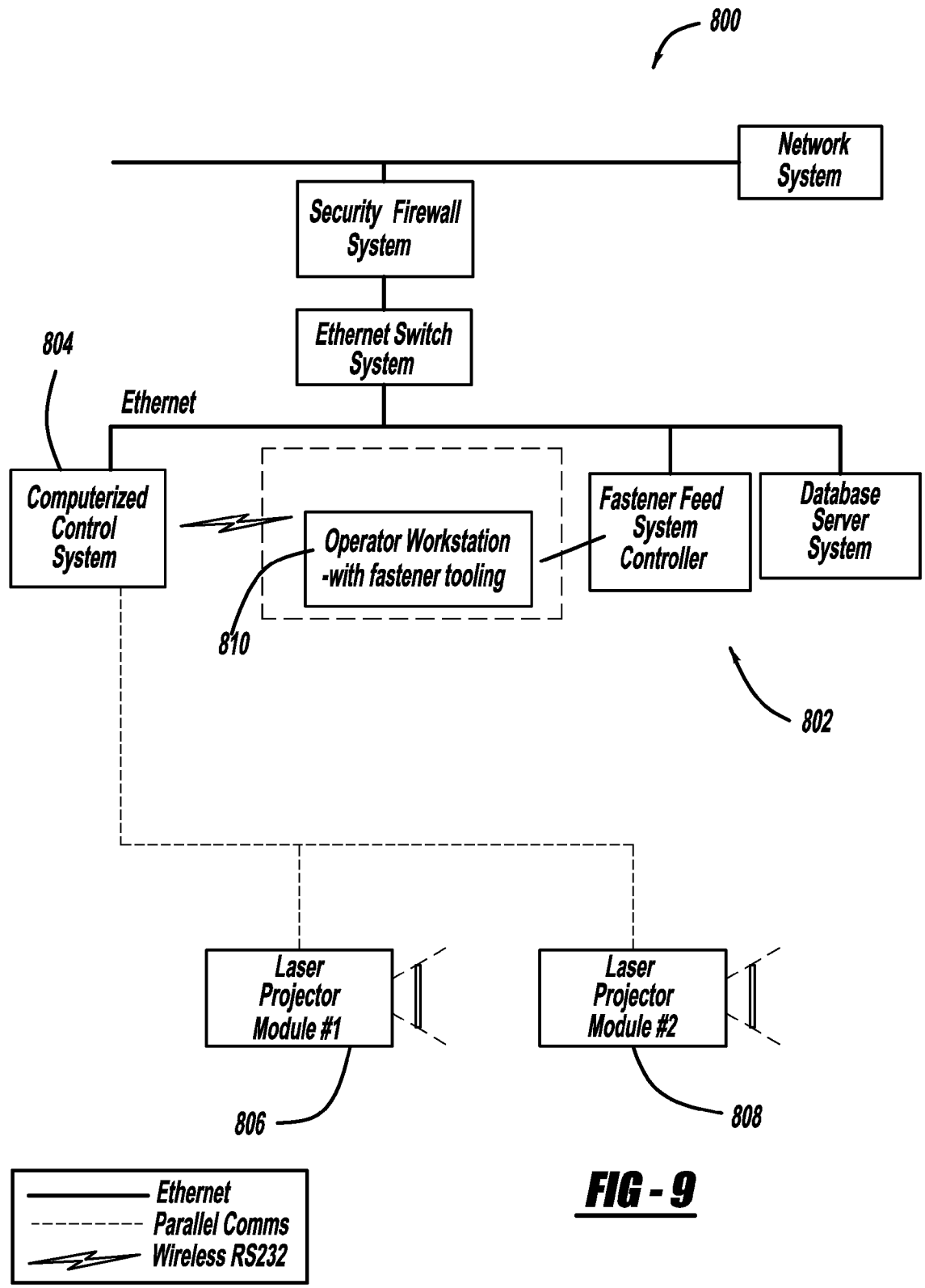
FIG. 9 illustrates a schematic view of a control architecture system with a fastener feed system, in accordance with a ninth embodiment of the present invention.

Referring to FIG. 9, there is shown a schematic view of a control architecture system 800 with a fastener feed system 802, in accordance with a ninth embodiment of the present invention. The fastener feed system 802 can work on demand from the computerized control system 804. After the holes have been gauged and the grip lengths established, the computer can store the appropriate fastener in its database. During the install phase of the assembly, the laser projector modules 806, 808, respectively, can locate the current fastener hole and display the text for the fastener ID. In parallel with initiating the laser projection or upon request from the operator, the computerized control system can send a command to the feed system identifying which fastener is required. The feed system will then deliver the fastener from the appropriate bowl to a fixture located within the workstation area 810 of the operator. Various sensing technology can be implemented to automatically detect incorrect fastener grip lengths. For example, in the bowl feed system, the fastener can be checked using two sensors. If the sensors are tripped incorrectly, it indicates that the fastener is too long or too short, has the wrong thread diameter or the like. This condition will fault the system and alert the operator to clear the fastener from the feed system. Having automatic grip length checking helps reduce the risk of installing an incorrect fastener. An automatic fastener feed system can help reduce the risk of FOD by minimizing the amount of manual intervention and handling of parts. The feed system rack can be isolated from the wing assembly area to avoid having fasteners dropped into the wing during loading of the bowls. The operator will no longer need to carry a stock of fasteners with him which will also reduce the potential for FOD.

Figure 10:
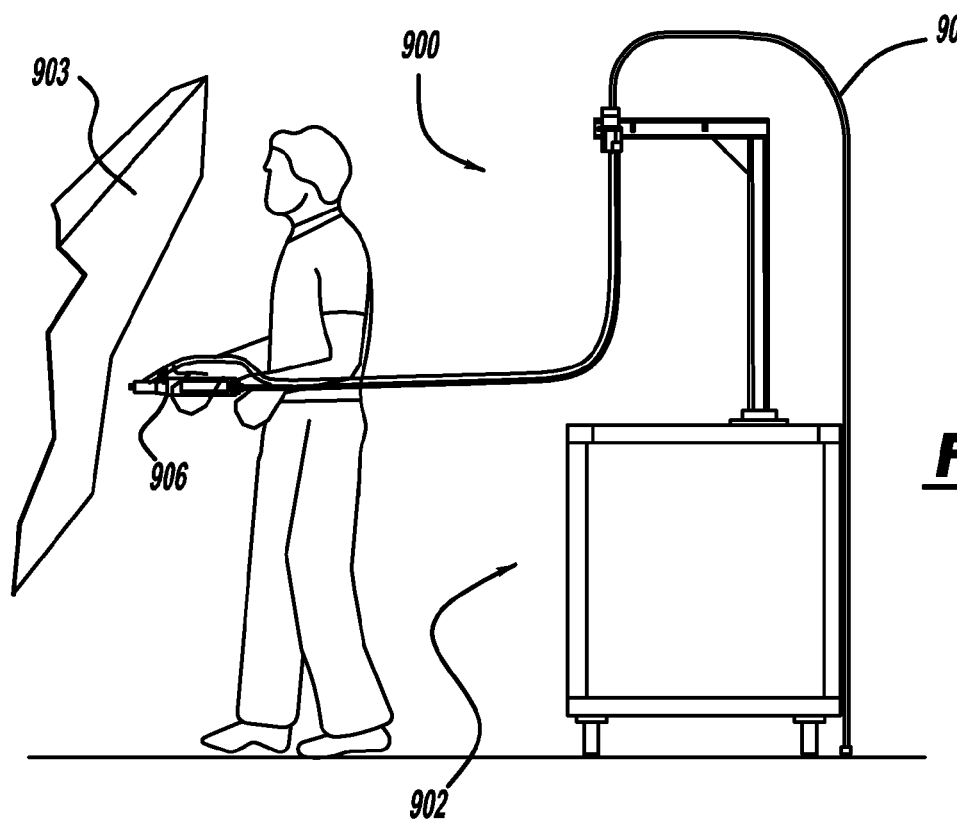
FIG. 10 illustrates a schematic view of a fastener feed system, in accordance with a tenth embodiment of the present invention.

Referring to FIG. 10, there is shown a schematic view of a fastener feed system 900, in accordance with a tenth embodiment of the present invention. Fastener feed tooling can be implemented onto a work cart 902 that is mobile for use in multiple locations, e.g., in proximity to a wing assembly 903. A blow feed tube 904 can be connected to a location in the platform floor to extend the feed system blow tube to the hand-held tooling 906 on the cart 902. The hand-held tool 906 will receive the fastener from the feed system previously described.

Figure 11:
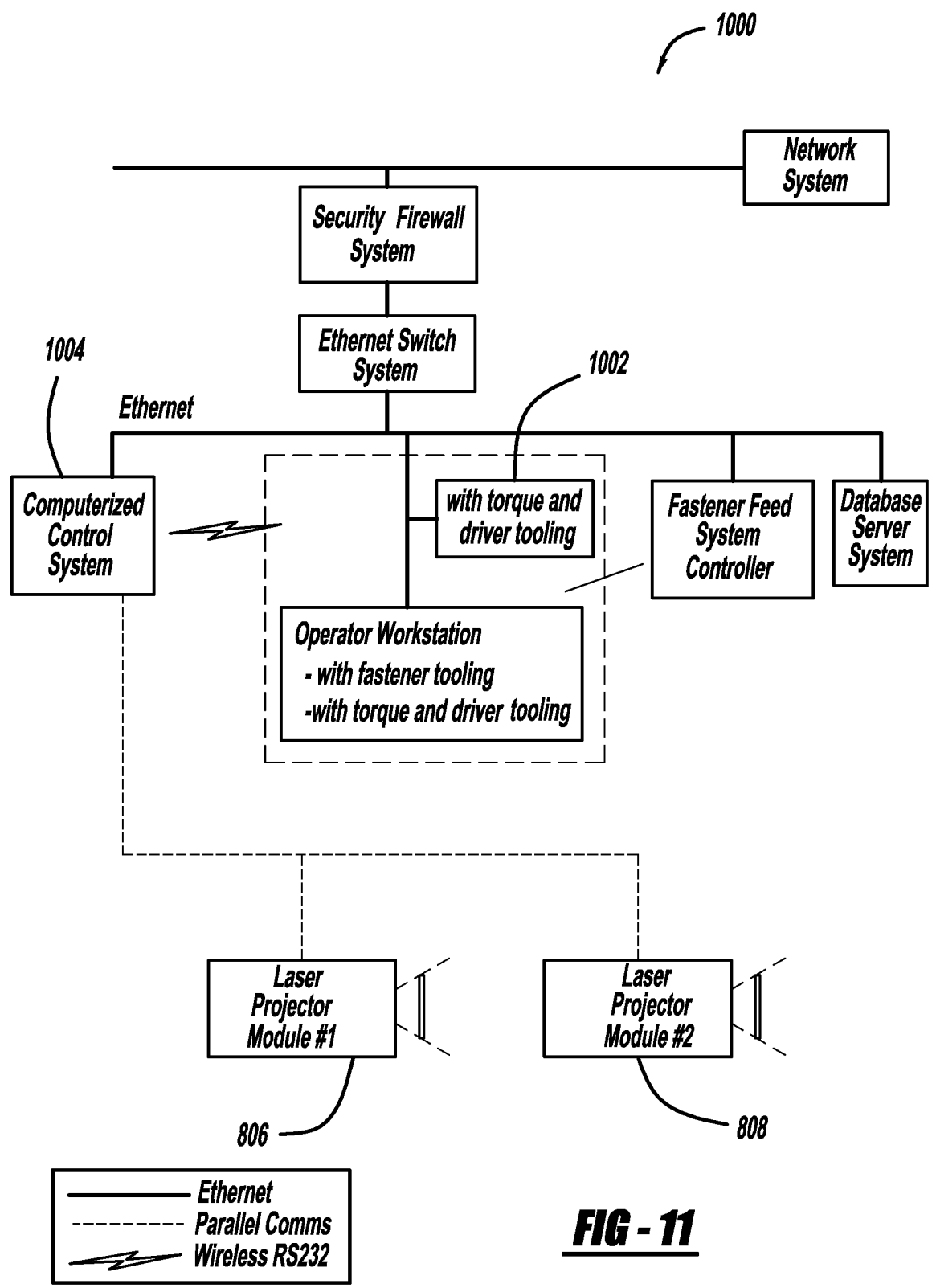
FIG. 11 illustrates a schematic view of a control architecture system with a torque control system, in accordance with an eleventh embodiment of the present invention.

Referring to FIG. 11, there is shown a schematic view of a control architecture system 1000 with a torque control system 1002, in accordance with an eleventh embodiment of the present invention. Due to the range of torque specifications over the entire wing assembly, a process was required to automatically change the torque setpoint. Currently, a conventional system employs a socket tray accessory that has a discrete input wired into the controller for each tray position. The controller is setup to change its torque parameters based on which driver bit has been removed from the tray. This method would provide some flexibility to handle the variations in torque requirements, but lends itself to operator error that is not detectable. That is, there is no traceability that the torque controller is using the correct setpoint based on the callout on the engineering drawing. In addition, the current conventional system does not feedback the result of each rundown for verification against the required specification.

The present invention provides a system for controlling the fastener installation that will significantly improve upon the current conventional system. For example, Atlas Copco controllers can be equipped with Ethernet communication capability which would allow for the addition of all torque controllers to the system's control network. With Ethernet communication, complete control and feedback flexibility is achievable. The computerized control system 1004 can control changing the tightening parameters automatically as required when the current working hole changes. With the ability to automatically change the torque controller setpoint, the procedure for installing fasteners becomes much more efficient. Based on the recorded final torque setpoint, the control system can calculate the required torque setpoint during the initial install to 80% and update the controller as required when the hole changes. The same function and time savings are realized again during the final tightening stage. This flexible control coupled with the laser projected hole location guidance can greatly improve the fastener installation process. The location of all setup holes can be easily identified to the operator and the status of each hole can be tracked to ensure the full procedure is followed. The wing assembly software can store all torque requirements for the wing assembly, and log the tightening result for every hole. Some tightening results available for retrieval are the final torque and angle achieved during the installation. These values can be logged and checked for possible errors in the tightening process. If the resultant torque for an installation does not fall within the engineering limits called out, the system software can automatically fault and alert the operator of the problem. This can safeguard against mechanical issues as well as operator error. Problems with the installation can be identified if the angle required to finish an installation does not fall within predetermined limits. This issue can indicate that a fastener is not fully seated, or that it is not properly threaded into the nut and has over rotated. With a complete database of torque results stored for every wing assembly, statistical analysis of the data can be performed to evaluate trends and identify areas for improvements. Extracting and implementing the torque data in this fashion highlights another way in which the present invention can be utilized for the wing assembly.

Figure 12:
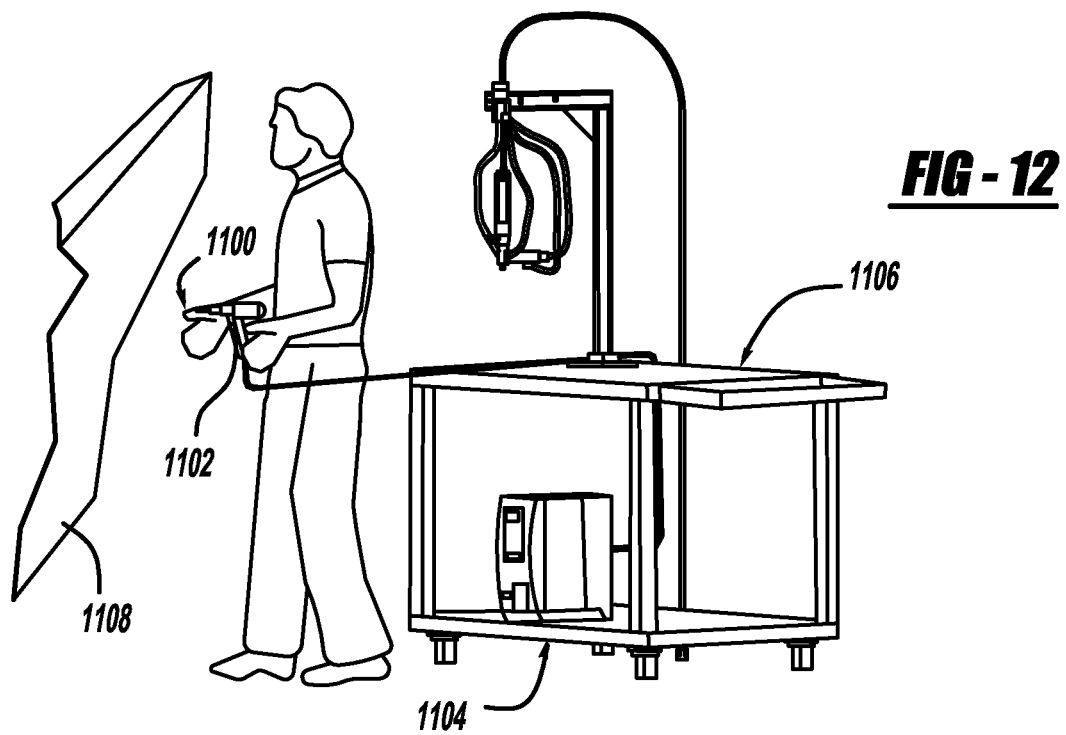
FIG. 12 illustrates a schematic view of a torque control system, in accordance with a twelfth embodiment of the present invention.

Referring to FIG. 12, there is shown a schematic view of a torque control system 1100, in accordance with a twelfth embodiment of the present invention. By way of a non-limiting example, the torque equipment 1102 (e.g., a torque gun) can be networked to a computer system 1104 with a connection in the platform floor where the workstation cart 1106 will be located. The hand-held torque tool 1102 can be capable of reaching the wing surface 1108 for installing fasteners.

Many technologies exist in the area of fluid dispensing that can address a number of the current process issues previously discussed. The promoter is typically a very "light" liquid substance with a density and consistency similar to water. These physical attributes make it a perfect candidate for dispensing automation.

Referring to FIG. 13, there is shown a schematic view of a promoter/sealant dispensing system 1200, in accordance with a thirteenth embodiment of the present invention. As used herein, the term "sealant" or sealant dispenser includes any component of a sealant system, including the promoter which may be fed or dispensed separately or in combination. The main components are the precision spray valve 1202, a microprocessor based valve controller 1204, and a fluid reservoir 1206. The valve controller 1204 can be set up for a precise dispensing time for consistent and repeatable spray. The valve 1202 itself is designed to reduce waste by producing high transfer efficiency. Fluid is dispensed only where needed without waste or overspray. The spray pattern is easily adjustable to ensure proper coverage of the fastener head.

Referring to FIG. 14, there is shown a schematic view of a control architecture system 1300 with a sealant dispensing system 1302, in accordance with a fourteenth embodiment of the present invention. The system 1300 can be controlled remotely by a computerized control system 1304 and dispense promoter onto the fastener in the correct areas.

Figure 15:
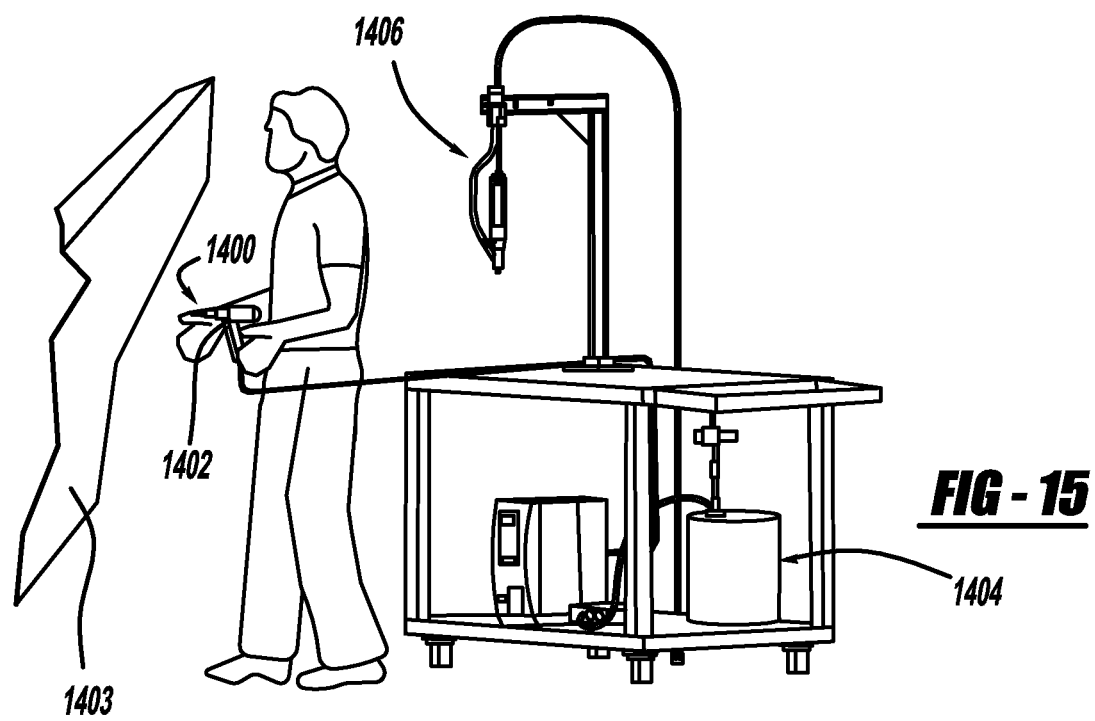
FIG. 15 illustrates a schematic view of a promoter/sealant dispensing system, in accordance with a fifteenth embodiment of the present invention.

Referring to FIG. 15, there is shown a schematic view of a sealant dispensing system 1400, in accordance with a fifteenth embodiment of the present invention. In this view, the concept includes mounting the promoter dispense head 1402 to the tool that receives the fastener from the feed system. Once the fastener arrives at the tool, the dispensing can be initiated on an appropriate surface of the wing assembly 1403. The system 1400 is completely contained and isolated from possibility of contaminants. The system software can also timestamp the event of promoter application to provide process tracking. As previously described, there are many time critical stages involved in the promoter and sealant application. With an electronic record of when the promoter was applied to a fastener, these time constraints can be tracked. The system can monitor when a fastener is approaching its time limit and alert the operator of this fact. This will allow the operator to take action before the time expires, hence avoiding rework.

With historical data tracked for the dispensing operation, it is possible to analyze if the current assembly procedure consistently approaches the time limit for liquid dispensed on certain fasteners. This analysis can help to refine the assembly process and re-organize the order in which fasteners are installed to avoid breaching time constraints and maximize efficiency. The application of sealant is more complicated than the promoter due to its physical characteristics. Most sealants are two-part composites which must be mixed with a precise ratio to be effective. There are also many time constraints involved with the sealant just as there was with the promoter. Commercially available dispensing equipment exists that combine the component mixing and dispensing in a single unit. Such systems can be integrated within the enhanced process to track sealant dispense time similar to that proposed for the sealant. Dispense quantities can be controlled and tracked to help support continuous improvement and decrease excess material disposition onto the parts. By way of a non-limiting example, the dispensing equipment 1404 for the promoter can be mounted to the fastener feed tool 1406 to allow automatic dispensing when the bolt is received.

The description of the invention is merely exemplary in nature and, thus, variations that do not depart from the gist of the invention are intended to be within the scope of the invention. Such variations are not to be regarded as a departure from the spirit and scope of the invention. Further, as set forth above, the term "substrate" broadly includes any workpiece, such as a composite workpiece or laminate, such as the outer skin and support structure of an aircraft wing or body portion.

What is claimed is:

1. A fastener automation system for assembly of a plurality of different fasteners to a substrate at predetermined locations, comprising:
    a projection system determining and projecting an image on a substrate, the image displaying precise predetermined locations of correct fasteners to be installed in said substrate at said predetermined locations selected from a plurality of different fasteners and displaying data relating to said correct fasteners to be installed at each location in said substrate selected from a plurality of different, wherein the data includes parameters and installation requirements for each of the correct fasteners; and
    a computer operably associated with said projection system storing data regarding the position and information regarding each of said correct fasteners to be installed at each location where a fastener is to be installed in said substrate.

2. The invention in accordance with claim 1, wherein said projection system includes at least two laser projectors having overlapping fields projecting the same data on said substrate.

3. The invention in accordance with claim 1, wherein said fastener automation system includes a fastener feed system operably associated with said computer feeding the correct fasteners from a plurality of different fasteners to be installed in said substrate at said predetermined location.

4. The invention in accordance with claim 1, wherein said fastener automation feed system includes a torque wrench operably associated with said computer.

5. The invention in accordance with claim 4, wherein said computer includes data regarding the torque to be applied to each of said correct fasteners from a plurality of different fasteners and controlling said torque wrench to apply a predetermined torque to each of said correct fasteners.

6. The invention in accordance with claim 1, wherein said fastener automation system includes a sealant dispenser operably associated with said computer.

7. The invention according to claim 6, wherein said computer includes data regarding the quantity of sealant to be applied to seal said correct fastener in said substrate and said computer controlling said sealant dispenser to apply a predetermined quantity of sealant.

8. A male fastener automation system for assembly of a plurality of different male fasteners into preformed holes of different parameters in a substrate, comprising:
    a projection system projecting a series of images on a substrate, the image displaying precise predetermined locations of holes in the substrate to receive the male fasteners selected from a plurality of different fasteners to be installed in said holes in said substrate at said predetermined locations and displaying data relating to said correct male fasteners, including the parameters and installation requirements for each male fastener; and
    a computer operably associated with said projection system storing data regarding precise locations of each of said holes and specific data regarding each of said correct male fasteners selected from a plurality of different male fasteners.

9. The invention in accordance with claim 8, wherein said fastener automation system includes a fastener feed system operatively associated with said computer feeding correct fasteners to be installed in said substrate at said predetermined locations.

10. The invention in accordance with claim 8, wherein said fastener automation feed system includes a torque wrench operably associated with said computer.

11. The invention in accordance with claim 10, wherein said computer includes data regarding the torque to be applied to said correct fasteners and controlling said torque wrench to apply a predetermined torque to said correct fasteners.

12. The invention in accordance with claim 8, wherein said fastener automation system includes a sealant dispenser operably associated with said computer.

13. The invention according to claim 12, wherein said computer includes data regarding the quantity of sealant to be applied to seal said correct fasteners in said substrate and said computer controlling said sealant dispenser to apply a predetermined quantity of sealant.

\* \* \* \* \*